(12) United States Patent  (10) Patent No.: US 7,422,731 B2
Nakatsuji et al.  (45) Date of Patent: Sep. 9, 2008

(54) CATALYST AND METHOD FOR CONTACT DECOMPOSITION OF NITROGEN OXIDES

(75) Inventors: Tadao Nakatsuji, Espoo (FI); Hiroshi Ohno, Osaka (JP)

(73) Assignee: Honda Motor Co., Ltd., Tokyo (JP)

( * ) Notice: Subject to any disclaimer, the term of this patent is extended or adjusted under 35 U.S.C. 154(b) by 379 days.

(21) Appl. No.: 10/570,629

(22) PCT Filed: Sep. 6, 2004

(86) PCT No.: PCT/JP2004/013276

§ 371 (c)(1),
(2), (4) Date: Mar. 3, 2006

(87) PCT Pub. No.: WO2005/023421

PCT Pub. Date: Mar. 17, 2005

(65) Prior Publication Data

US 2007/0025901 A1  Feb. 1, 2007

(30) Foreign Application Priority Data

Sep. 8, 2003 (JP) ............................. 2003-315093

(51) Int. Cl.
*B01D 53/56* (2006.01)
*B01D 53/94* (2006.01)
*B01J 23/00* (2006.01)
*B01J 23/10* (2006.01)
*B01J 23/40* (2006.01)

(52) U.S. Cl. .................... 423/239.1; 502/302; 502/303; 502/304; 502/325; 502/349

(58) Field of Classification Search ................ 502/302, 502/303, 304, 325, 349; 423/239.1
See application file for complete search history.

(56) References Cited

U.S. PATENT DOCUMENTS 4,707,341 A * 11/1987 Koch et al. ................... 422/171
6,040,265 A * 3/2000 Nunan .......................... 502/242
7,081,430 B2 * 7/2006 Uenishi et al. .............. 502/327

FOREIGN PATENT DOCUMENTS

| JP | 07-232064 | 9/1995 |
| JP | 08-173815 | 7/1996 |
| JP | 09-215922 | 8/1997 |
| JP | 11-290686 | 10/1999 |
| JP | 2000-157867 | 6/2000 |
| JP | 2002-079096 | 3/2002 |

* cited by examiner

*Primary Examiner*—Timothy C Vanoy
(74) *Attorney, Agent, or Firm*—Wenderoth, Lind & Ponack, L.L.P.

(57) ABSTRACT

The invention provides a catalyst for catalytic direct decomposition of nitrogen oxides contained in exhaust gases wherein fuel is supplied and subjected to combustion under periodic rich/lean conditions and the resulting exhaust gases are brought into contact therewith, which catalyst comprises:

(A) a first catalyst component comprising at least one metal selected from the group consisting of rhodium and palladium supported on zeolite;

(B) a second catalyst component comprising at least one selected from the group consisting of (a) ceria, (b) praseodymium oxide, and (c) a mixture and/or a composite oxide of oxides of at least two elements selected from the group consisting of cerium, zirconium, praseodymium, neodymium, terbium, samarium, gadolinium and lanthanum; and (C) a third catalyst component comprising (a) at least one selected from the group consisting of platinum, rhodium, palladium and oxides thereof, and (b) a carrier.

2 Claims, 3 Drawing Sheets

CATALYST AND METHOD FOR CONTACT DECOMPOSITION OF NITROGEN OXIDES

TECHNICAL FIELD

The invention relates to a catalyst and a method for catalytic direct decomposition of nitrogen oxides (which mainly comprises NO and $NO_2$, and will be referred to as NOx hereunder). More particularly, the invention relates to a catalyst for direct decomposition of NOx contained in exhaust gases wherein fuel is supplied to a combustion chamber of a diesel engine or a gasoline engine and subjected to combustion with periodic rich/lean excursions and the resulting exhaust gases are brought into contact therewith, and a method for direct decomposition of NOx contained in exhaust gases using such a catalyst. This catalyst and the method using the same are suitable for reducing and removing harmful nitrogen oxides contained in exhaust gases, e.g., from engines of automobiles.

The invention further relates to a durable catalyst for direct decomposition of NOx contained in exhaust gases in the presence of sulfur oxides (which mainly comprises $SO_2$ and $SO_3$, and will be referred to as SOx hereunder) wherein fuel is supplied and subjected to combustion with periodic rich/lean excursions whereby NOx is generated in the exhaust gases.

BACKGROUND ART

In the invention, by the term "excursion" is meant a movement or such operations of air/fuel ratio outward and back from a mean value thereof along a time axis. By the term "rich" is meant an air/fuel ratio smaller than the stoichiometric air/fuel ratio of the fuel in question, while by the term "lean" is meant an air/fuel ratio larger than the stoichiometric air/fuel ratio of the fuel in question. For normal automobile gasoline, the stoichiometric air/fuel ratio is approximately 14.5. Further, the term "catalyst" includes a catalyst itself as well as a catalyst structure which contains the catalyst and works to remove NOx during rich/lean combustion of fuel.

Accordingly, by the term "supplying fuel with periodic rich/lean excursions" is especially meant that fuel is supplied, injected or jetted to a combustion chamber of a diesel engine or a gasoline engine, and is subjected to combustion mainly under the lean conditions (wherein the oxygen concentration in the exhaust gases after combustion of fuel is typically in a range of approximately 5% to 10%) while air/fuel ratio is so adjusted that the combustion atmosphere of fuel is periodically oscillated between the rich conditions and lean conditions. Therefore, "the rich/lean excursions" has the same meaning as "the rich/lean conditions".

NOx contained in exhaust gases has conventionally been removed by, for example, a method in which the NOx is oxidized and then absorbed in an alkaline solution or a method in which the NOx is reduced to nitrogen by using a reducing agent such as ammonia, hydrogen, carbon monoxide or hydrocarbons. However, these conventional methods have their own disadvantages.

That is, the former method requires a means for handling the resulting alkaline waste liquid to prevent environmental pollution. The latter method, for example, when it uses ammonia as a reducing agent, involves the problem that ammonia reacts with SOx in the exhaust gases to form salts, resulting in a deterioration in catalytic activity at low temperatures. On the other hand, when hydrogen, carbon monoxide or hydrocarbons is used as a reducing agent, the reducing agent reacts preferentially with oxygen since the waste gas contains oxygen in a higher concentration than NOx. This means that substantial reduction of NOx needs a large quantity of a reducing agent.

It was therefore proposed to catalytically decompose NOx in the absence of a reducing agent. However, the catalysts conventionally known for direct decomposition of NOx have not yet been put to practical use due to their low decomposition activity. On the other hand, a variety of zeolites were proposed as a catalyst for the catalytic reduction of NOx using a hydrocarbon or an oxygen-containing organic compound as a reducing agent. In particular, Cu-ion exchanged ZSM-5 or H type (hydrogen type or acid type) zeolite ZSM-5 ($SiO_2$/$Al_2O_3$ molar ratio=30 to 40) is regarded as optimal. However, it was found that even the H type zeolite does not have sufficient reduction activity, and particularly the zeolite catalyst was rapidly deactivated on account of dealumination of the zeolite structure when water was contained in the exhaust gas.

Under these circumstances, it has been demanded to develop a more active catalyst for the catalytic reduction of NOx. Accordingly, a catalyst composed of an inorganic oxide carrier material having silver or silver oxide supported thereon has recently been proposed, as described in EP-A1-526099 or EP-A1-679427. It has been found that the catalyst has a high activity for oxidation, but has a low activity for selective reduction of NOx, so that the catalyst has a low conversion rate of NOx to nitrogen. In addition, the catalyst involves the problem that it is rapidly deactivated in the presence of SOx. The catalyst catalyzes the selective reduction of NOx with hydrocarbons under full lean conditions, but it has a lower NOx conversion and a narrower working temperature window (temperature range) than a known three way catalyst. This makes it difficult for such lean NOx catalysts to be practically used. Thus, there has been an urgent demand for a more heat-resistant and active catalyst for the catalytic reduction of NOx.

In order to overcome the above-mentioned problems, a NOx storage-reduction system has recently been proposed as one of the most promising methods, as described in WO 93/7363 or WO 93/8383. In the proposed system, fuel is periodically spiked for a short moment to a combustion chamber in excess of the stoichiometric amount. Vehicles with lean burn engines can be driven at lower fuel consumption rates than conventional vehicles. It is because such vehicles can be driven at a much lower fuel/air ratio than the conventional vehicles. This NOx storage-reduction system for lean burn engines reduces NOx in two periodic steps at intervals of one to two minutes.

That is, in the first step, NO is oxidized to $NO_2$ on a platinum or rhodium catalyst under (normal) lean conditions, and the $NO_2$ is absorbed in an absorbent comprising such an alkali compound as potassium carbonate or barium carbonate. Subsequently, rich conditions are formed for the second step, and the rich conditions are maintained for several seconds. Under the rich conditions, the absorbed (or stored) $NO_2$ is emitted from the absorbent and efficiently reduced to nitrogen with hydrocarbons, carbon monoxide or hydrogen on the platinum or rhodium catalyst. This NOx storage-reduction system works well over a long period in the absence of SOx. However, in the presence of SOx, the catalytic system deteriorates drastically due to the irreversible absorption of SOx at $NO_2$ absorption sites on the alkali compound under either the lean or the rich conditions.

Then, as another method for overcoming the above-mentioned problems, a method, in which although fuel is periodically supplied for a short moment to a combustion chamber in excess of the stoichiometric amount in the same manner as the NOx storage-reduction system, NOx is not absorbed in alkali compounds under lean conditions but decomposed to nitrogen and oxygen on rhodium and/or palladium metal supported on A type zeolite without a reducing agent, and the resulting oxygen is removed by a reducing agent under rich conditions, has been proposed in Japanese Patent Application Laid-Open No. 2001-149758. This method has originally high SOx durability for the reason that NOx does not need to be absorbed in alkali compounds under lean conditions. However, this method involves the problem that it is inferior in NOx purification efficiency to the NOx storage-reduction system.

It is an object of the invention to provide a catalyst and a method for catalytic direct decomposition of NOx contained in exhaust gases wherein fuel is supplied and subjected to combustion with a periodic rich/lean excursions, whereby NOx is generated in the exhaust gases, with high durability in a wide temperature range even in the presence of oxygen, sulfur oxides or water.

DISCLOSURE OF THE INVENTION

The invention provides a catalyst for catalytic direct decomposition of nitrogen oxides contained in exhaust gases wherein fuel is supplied and subjected to combustion under periodic rich/lean conditions and the resulting exhaust gases are brought into contact therewith, which catalyst comprises:

(A) a first catalyst component comprising at least one metal selected from the group consisting of rhodium and palladium supported on zeolite;

(B) a second catalyst component comprising at least one selected from the group consisting of (a) ceria, (b) praseodymium oxide, and (c) a mixture and/or a composite oxide of oxides of at least two elements selected from the group consisting of cerium, zirconium, praseodymium, neodymium, terbium, samarium, gadolinium and lanthanum; and (C) a third catalyst component comprising (a) at least one selected from the group consisting of platinum, rhodium, palladium and oxides thereof, and (b) a carrier.

The invention further provides a method for catalytic direct decomposition of nitrogen oxides contained in exhaust gases wherein fuel is supplied and subjected to combustion under periodic rich/lean conditions and the resulting exhaust gases are brought into contact with a catalyst, which catalyst comprises:

(A) a first catalyst component comprising at least one metal selected from the group consisting of rhodium and palladium supported on zeolite;

(B) a second catalyst component comprising at least one selected from the group consisting of (a) ceria, (b) praseodymium oxide, and (c) a mixture and/or a composite oxide of oxides of at least two elements selected from the group consisting of cerium, zirconium, praseodymium, neodymium, terbium, samarium, gadolinium and lanthanum; and (C) a third catalyst component comprising (a) at least one selected from the group consisting of platinum, rhodium, palladium and oxides thereof, and (b) a carrier.

BEST MODE FOR CARRYING OUT THE INVENTION

Figure 1:
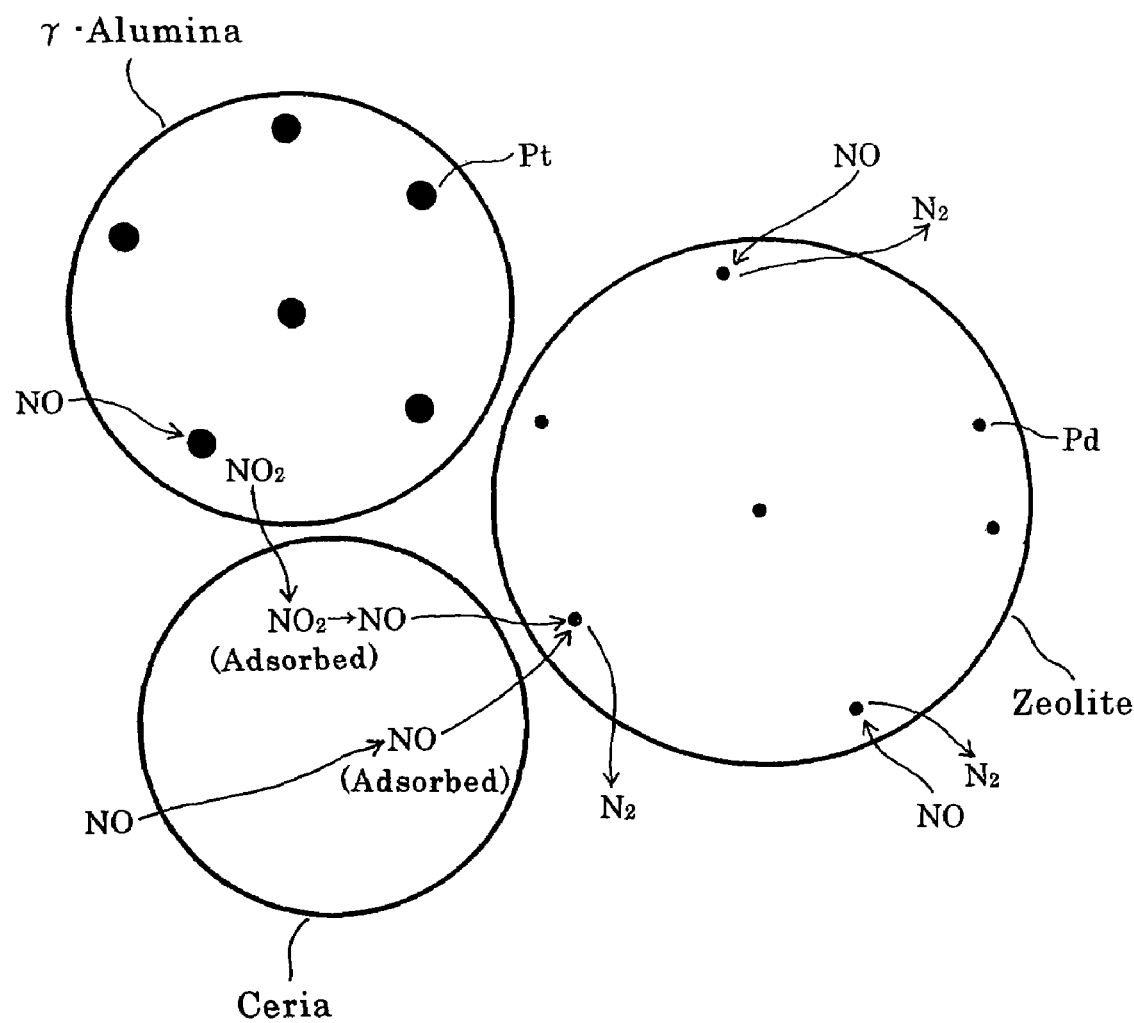
FIG. 1 is a schematic view showing a mechanism in which nitrogen oxides contained in exhaust gases are directly decomposed to nitrogen and oxygen in the presence of the catalyst according to the invention.

Herein the invention, the catalytic direct decomposition of nitrogen oxides means that NOx is directly decomposed to nitrogen and oxygen by catalytic action of a catalyst.

The catalyst for catalytic direct decomposition of nitrogen oxides according to the invention comprises:

(A) a first catalyst component comprising at least one metal selected from the group consisting of rhodium and palladium supported on zeolite;

(B) a second catalyst component comprising at least one selected from the group consisting of (a) ceria, (b) praseodymium oxide, and (c) a mixture and/or a composite oxide of oxides of at least two elements selected from the group consisting of cerium, zirconium, praseodymium, neodymium, terbium, samarium, gadolinium and lanthanum; and (C) a third catalyst component comprising (a) at least one selected from the group consisting of platinum, rhodium, palladium and oxides thereof, and (b) a carrier.

According to the invention, the catalyst is preferably used as a catalyst structure comprising the catalyst supported on an inactive substrate. Therefore, the catalyst may contain various additives, for example, so that it has coating properties when it is coated in the form of slurry on an inactive substrate. The catalyst may also contain various additives, for example, so that it has improved strength. According to the invention, however, the total amount of the first catalyst component, the second catalyst component and the third catalyst component in the catalyst occupies at least 80% by weight, preferably at least 95% by weight.

Further, the proportion of the first catalyst component is in a range of 25 to 75% by weight, and the proportion of the second and the third catalyst components is each in a range of 12.5 to 37.5% by weight. When the proportion of the first, the second or the third catalyst components is out of the above-mentioned range, the direct decomposition power of NOx of the first catalyst component, the concentration effect of NOx of the second catalyst component or the complement effect of NOx purification of the third catalyst component as described later is so decreased as to deteriorate NOx purification efficiency.

The first catalyst component preferably contains at least one noble metal selected from the group consisting of rhodium and palladium or at least one of the oxides of the noble metal in a range of 0.05 to 2% by weight in terms of metal based on the first catalyst component. When the proportion of the noble metal or oxide thereof in the first catalyst component exceeds 2% by weight in terms of metal, the noble metal generated in such a manner that the oxide is reduced under rich conditions is easily oxidized under lean conditions, so that the selectivity of direct decomposition of NO by catalytic reaction of the first catalyst component becomes low under lean conditions. On the other hand, when the proportion of the noble metal or oxide thereof in the first catalyst component is less than 0.05% by weight in terms of metal, the obtained catalyst is inferior in catalytic reaction activity. In particular, it is preferred that the first catalyst component contains the noble metal or oxide thereof in a range of 0.1 to 1% by weight in terms of metal. The use of the catalyst having such a first catalyst component makes it possible to decompose NOx directly most efficiently under lean conditions.

According to a preferred embodiment of the invention, the noble metal or oxide thereof in the first catalyst component is highly dispersed and supported on zeolite, and the mean particle diameter of the noble metal or oxide thereof is preferably less than 10 nm, particularly preferably less than 6 nm, most preferably less than 3 nm. The mean particle diameter of such noble metal or oxide thereof can be measured, for example, by observing with a transmission electron microscope (TEM). According to the invention, a catalyst which works particularly well can be obtained by highly dispersing and uniformly supporting the above-mentioned noble metal or oxide thereof on zeolite as such minute particles.

The zeolite which supports the noble metal or oxide thereof in the first catalyst component has not merely such a role as a carrier of the noble metal or oxide thereof but also a role as a co-catalyst for improving the reducing power of oxide of the noble metal to the noble metal to restrain the oxidation of the noble metal to oxide thereof under rich conditions.

The zeolite used in the first catalyst component has a specific surface area preferably in a range of 200 to 900 m²/g before it supports the noble metal. The zeolite used in the invention generally has a crystal unit cell represented by the following formula

$$M_{x/n} \cdot \{(AlO_2)_x \cdot (SiO_2)_y\} \cdot wH_2O \quad (I)$$

in which M denotes a cation, n denotes the valence number of the cation M, w denotes the number of water molecules per unit cell, x and y denote the total number of tetrahedrons per unit cell, x is an integer from 10 to approximately 1000, and y/x denotes a value from approximately 10 to approximately 300.

The zeolite as mentioned above can be obtained by treating heat-resistant zeolite having the above-mentioned unit cell formula (I), in which M denotes an alkali metal cation or an alkaline earth metal cation, and aluminum may be substituted with other metallic elements by a part or all, particularly preferably by all, with an aqueous solution of ammonium salt or proton acid to substitute a part or all of M with ammonium ion or hydrogen ion.

In the reparation of zeolite preferably used in the invention, typical starting materials are Na-β-zeolite, Na-mordenite, Na-ZSM-5, Na-USY (ultrastable Y type zeolite) or metallosilicates (that is, such a zeolite in which aluminum is substituted by a part or all with other metallic elements, particularly Fe, Ga, Zn, La, Cu, Mo, Cr, Ge, Ti or B). Typical ammonium salt for treating heat-resistant zeolite is ammonium sulfate and typical acid is sulfuric acid.

Among the above-mentioned zeolite, β-zeolite is most preferred by reason of not merely having durability at high temperatures but also excelling in the effect of supporting the aforesaid noble metal or oxide thereof. Zeolite is crystalline aluminum silicate having a porous structure, and β-zeolite can be identified by X-ray diffraction peak based on its particular crystalline structure. The $SiO_2/Al_2O_3$ molar ratio in β-zeolite is typically from approximately 20 to approximately 300, varying with production conditions of the zeolite.

The first catalyst component in which the above-mentioned noble metal or oxide thereof is supported on the zeolite as mentioned above can be prepared by various methods. The following method can be exemplified as one method. That is, a water-soluble salt of the noble metal element, such as nitrate, is supported on a zeolite by a usual method such as an impregnation method or an ion exchange method, and subsequently the obtained product is calcined in oxidizing or reducing atmosphere at a temperature of 300 to 900° C. to generate the noble metal or oxide thereof, whereby the first catalyst component can be obtained.

For further details, an aqueous slurry of zeolite is first prepared, and a water-soluble salt of the noble metal element, such as nitrate, is added thereto to fix the noble metal ions at ion exchange sites of zeolite while maintaining the pH of the slurry at approximately 4.0 so that hydroxides of the noble metal are not generated. Subsequently, zeolite thus subjected to noble metal ion exchange is washed to remove excessive nitric acid ions from this zeolite, whereby zeolite supporting the noble metal ions is obtained. The product thus obtained is calcined in oxidizing atmosphere such as air or reducing atmosphere such as hydrogen in a temperature range of 300 to 900° C., preferably 400 to 600° C. to generate the noble metal or oxide thereof on zeolite, and thus a catalyst comprising ion-exchanged zeolite supporting the noble metal or oxide thereof can be obtained as powder.

In the catalyst according to the invention, the second catalyst component comprises at least one selected from the group consisting of (a) ceria,
(b) praseodymium oxide, and
(c) a mixture and/or a composite oxide of oxides of at least two elements selected from the group consisting of cerium, zirconium, praseodymium, neodymium, terbium, samarium, gadolinium and lanthanum.

The second catalyst component comprises either the above-mentioned (a) component, or (b) component, or (c) component, or a mixture of these two components or more.

The second catalyst component can be obtained as powder by the following method, for example. An aqueous solution of a water-soluble salt of an element composing the catalyst component, such as nitrate, is first neutralized or heated and hydrolyzed to form hydroxides, and thereafter the obtained product is calcined in oxidizing or reducing atmosphere at a temperature of 300 to 900° C. The second catalyst component can be obtained also by calcining commercially available hydroxides and oxides of the above-mentioned elements as described above.

According to the invention, a composite oxide of at least two elements mentioned hereinbefore is preferably used among the (c) components, and particularly a binary or a ternary composite oxide is preferably used.

The catalyst according to the invention further contains the third catalyst component comprising (a) at least one selected from the group consisting of platinum, rhodium, palladium and oxides thereof, and
(b) a carrier, in addition to the first catalyst component and the second catalyst component.

The third catalyst component can be obtained as powder in such a manner that a water-soluble salt of platinum, rhodium and/or palladium as noble metal, such as nitrate or complex salt, is supported on conventionally known carriers such as alumina, silica alumina, zeolite or titania by a usual impregnation method or an ion exchange method. In particular, alumina superior in supporting properties and heat resistance is preferably used among these carriers. The supporting amount of the above-mentioned noble metal or oxide thereof in the third catalyst component is usually in a range of 0.5 to 3% by weight based on the third catalyst component.

The catalyst according to the invention can be obtained in the form of powder as described above. Accordingly, such powdery catalyst can be molded into various shapes such as honeycomb, annular or spherical shape by hitherto well-known methods. When such a molded catalyst is prepared, suitable additives such as molding assistant, reinforcing material, inorganic fiber and organic binder can be used as required.

In particular, the catalyst according to the invention is advantageously used as a catalyst structure comprising an inactive substrate and a catalyst layer formed on the surface thereof by a wash-coating method (for example, by coating). The inactive substrate may be made of clay mineral such as cordierite, metal such as stainless steel, preferably heat-resistant metal such as Fe—Cr—Al, which shape may be honeycomb, annular structure and spherical structure.

When the catalyst of the invention is used as a catalyst structure comprising an inactive substrate and a catalyst layer formed thereon, the catalyst layer is preferably formed so as to have a thickness extending over 20 μm or more from the surface thereof in order that the catalyst structure may have high purification activity for nitrogen oxides in the rich/lean excursions. However, in order to develop the function as a catalyst, the catalyst layer does not need to be aimlessly thickened. The thickness of the catalyst layer is usually up to 200 μm. Even though the thickness of the catalyst layer exceeds 200 μm, the catalyst structure does not improve in performance of catalytic activity corresponding to such a thickness, and additionally it is not preferable to aimlessly thicken the catalyst layer in view of manufacturing costs.

For example, in the case where a wall of a porous honeycomb substrate is impregnated with a catalyst as slurry to form a catalyst layer thereon, the wall of a honeycomb substrate preferably has a thickness of 40 μm or more so as to have a catalyst layer having a thickness of 20 μm or more each from both sides thereof.

The method for catalytic direct decomposition of nitrogen oxides contained in exhaust gases according to the invention is such that fuel is supplied and subjected to combustion under periodic rich/lean conditions and the resulting exhaust gases are contacted with such a catalyst which is set forth above.

A main reaction occurring in the method of the invention, namely, a main reaction occurring in the catalytic direct decomposition of nitrogen oxides using the catalyst of the invention is conceived to be as follows. FIG. 1 is a schematic view showing a mechanism of direct decomposition of NOx to nitrogen and oxygen by using the catalyst of the invention. That is, as shown in FIG. 1, under lean conditions (namely, oxidizing conditions), a part of NOx in exhaust gases is adsorbed as NO or $NO_2$ onto the second catalyst component in the catalyst and concentrated thereon, and the $NO_2$ thus concentrated is decomposed to NO and oxygen. Then, NO adsorbed and concentrated on the second catalyst component in the catalyst and NO generated by the decomposition of concentrated $NO_2$ are decomposed to nitrogen and oxygen on the first catalyst component comprising the noble metal supported on the zeolite. The oxygen thus generated is accumulated on the first catalyst component, so that direct decomposition efficiency of NO by the first catalyst component is gradually deteriorated.

However, under rich conditions following the lean conditions (namely, reducing conditions), the oxygen accumulated on the first catalyst component is reduced and removed therefrom, so that the first catalyst component is revived under rich conditions. Therefore, according to the invention, the proper setting of lean time period as well as rich/lean period allows high NOx purification efficiency to be obtained.

Additionally, according to the invention, under lean conditions, the third catalyst component comprising the noble metal supported on the carrier oxidizes NO in NOx to promote adsorption of NOx onto the second catalyst component and concentration thereon, and consequently improve decomposition efficiency of NO to nitrogen and oxygen on the first catalyst component.

Depending on rich/lean conditions, the total amount of NOx adsorbed and concentrated on the second catalyst component is not directly decomposed on the first catalyst component but the residue of adsorbed and concentrated NOx is desorbed from the second catalyst component during rich conditions to deteriorate NOx purification efficiency; however, here the third catalyst component reduces this NOx to prevent NOx purification efficiency from being deteriorated. Thus, according to the invention, the proper setting of lean time period as well as rich/lean period allows high NOx purification efficiency to be obtained.

It is also an important point that the third catalyst component improves the responsibility of catalytic reaction when the atmosphere of exhaust gases is switched from lean conditions to rich conditions, so that the removal of accumulated oxygen and the reduction of the first catalyst component are rapidly performed.

Any of the catalysts according to the invention is superior in resistance to sulfur oxides as well as resistance to heat. Therefore, it is suitable for being used as a catalyst for the reduction of NOx, namely, the denitration of NOx contained in exhaust gases from diesel engine or lean gasoline engine automobiles.

The catalyst of the invention is used in the catalytic reaction under the conditions that the combustion atmosphere of fuel oscillates between the rich and lean conditions as described above. Here, the period of the catalytic reaction (namely, the interval between the rich atmosphere (or lean atmosphere) and the subsequent rich atmosphere (or lean atmosphere)) is preferably 5 to 120 seconds, particularly preferably 10 to 100 seconds. The time under the rich conditions and the time under the lean conditions are each typically in a range of 0.5 to 100 seconds, preferably in a range of 4.5 to 90 seconds.

The rich conditions are usually prepared by periodically injecting fuel into a combustion chamber of an engine at an air/fuel weight ratio of 10 to 14 when gasoline is used as fuel. The typical exhaust gases under the rich conditions contain several hundreds ppm by volume of NOx, 5 to 10% by volume of water, 2 to 3% by volume of CO, 2 to 3% by volume of hydrogen, several thousands ppm by volume of hydrocarbons and 0 to 0.5% by volume of oxygen. In turn, the lean conditions are usually prepared by periodically injecting fuel into a combustion chamber of an engine at an air/fuel weight ratio of 20 to 40 when gasoline is used as fuel. The typical exhaust gases under the lean conditions contain several hundreds ppm by volume of NOx, 5 to 10% by volume of water, several thousands ppm by volume to 2% by volume of CO, several thousands ppm by volume to 2% by volume of hydrogen, several thousands ppm by volume of hydrocarbons and 5 to 10% by volume of oxygen.

The temperature appropriate for catalytic direct decomposition of NOx using the catalyst of the invention is usually in a range of 100 to 400° C., preferably 150 to 350° C., so that the catalyst has an effective catalytic activity for decomposition of NOx over a long period of time in the rich excursion, although it depends on individual gas composition. Within such a temperature range of the reaction, the exhaust gases are preferably treated at a space velocity of 5000 to 100000 $h^{-1}$.

INDUSTRIAL APPLICABILITY

According to the invention, as described above, NOx-containing exhaust gases are contacted with the catalyst with the periodic rich/lean excursions so that NOx contained in the exhaust gases can be directly decomposed catalytically in a stable and efficient manner even in the presence of oxygen, sulfur oxides or moisture.

EXAMPLES

The invention is hereinafter described with reference to examples; however, it should be understood that the invention is not deemed to be limited thereto. All the parts and percentages are hereinafter on the basis of weight unless otherwise specified.

Example 1

33.50 g of aqueous solution of rhodium nitrate (0.9% as rhodium) was added to 1700 ml of ion-exchanged water. After 60 g of hydrogen type β-zeolite (BEA-25, manufactured by Zoude Chemical Inc., $SiO_2/Al_2O_3$ molar ratio=25) was dried at a temperature of 120° C. for 24 hours, it was added to the aqueous solution of rhodium nitrate to obtain slurry. 0.1-N ammonia water was added dropwise into the slurry with stirring while maintaining the pH of the slurry at approximately 4 by using a pH controller. After the completion of dropwise addition, the slurry was aged for one hour to prepare β-zeolite supporting rhodium ions. The β-zeolite supporting rhodium ions thus prepared was collected by filtration and washed sufficiently with ion-exchanged water to obtain β-zeolite powder supporting 0.5% of rhodium ions as rhodium. The β-zeolite powder supporting rhodium ions thus obtained was calcined in the air at a temperature of 500° C. for 3 hours to obtain β-zeolite powdery catalyst supporting 0.5% (on the basis of β-zeolite powdery catalyst) of rhodium metal in terms of rhodium.

151.37 g of cerium nitrate ($Ce(NO_3)_3.6H_2O$) was dissolved in 1700 ml of ion-exchanged water to prepare an aqueous solution. 0.1-N ammonia water was added to the aqueous solution to neutralize and hydrolyze the cerium salt, and the mixture was then aged at a temperature of 80° C. for one hour. The resulting product was separated from the obtained slurry by filtering, dried at a temperature of 120° C. for 24 hours, and then calcined in the air at a temperature of 500° C. for 3 hours to obtain ceria powder (having a specific surface area of 138 $m^2/g$).

3.40 g of aqueous solution of $Pt(NH_3)_4(NO_3)_4$ (9.0% as platinum) was added to 1700 ml of ion-exchanged water to prepare an aqueous solution. 15 g of γ-alumina (KC-501, manufactured by Sumitomo Chemical Co., Ltd.) was added to the aqueous solution, dried at a temperature of 100° C. while stirred, and then calcined in the air at a temperature of 500° C. for 3 hours to obtain a catalyst powder supporting 2% of platinum on the alumina.

30 g of the β-zeolite powdery catalyst supporting 0.5% of rhodium, 15 g of ceria and 15 g of the catalyst powder supporting 2% of platinum on the alumina were mixed with 12 g of silica sol (SNOWTEX N, manufactured by Nissan Chemical Industries, Ltd. (20% by weight as silica)) and an appropriate amount of water. The resulting mixture was ground with a planetary mill for 5 minutes by using 50 g of zirconia balls as grinding media to obtain a coating slurry. A honeycomb substrate made of cordierite having a cell number of 400 per square inch was coated with the coating slurry to obtain a honeycomb catalyst structure having a catalyst layer with a thickness of 20 μm comprising the above-mentioned catalyst.

Example 2

β-zeolite powdery catalyst supporting 0.75% (on the basis of β-zeolite powdery catalyst) of rhodium metal in terms of rhodium was obtained in the same manner as Example 1 except for using 50.40 g of aqueous solution of rhodium nitrate.

103.77 g of cerium nitrate ($Ce(NO_3)_3.6H_2O$), 84.45 g of zirconium oxynitrate ($ZrO(NO_3)_2$) and 7.97 g of lanthanum nitrate ($La(NO_3)_3.6H_2O$) were dissolved in 1700 ml of ion-exchanged water to prepare an aqueous solution. 0.1-N ammonia water was added to the aqueous solution to neutralize and hydrolyze the cerium salt, oxyzirconium salt and lanthanum salt, and the resulting mixture was aged at a temperature of 80° C. for one hour. The resulting product was separated from the obtained slurry by filtering, dried at a temperature of 120° C. for 24 hours, and then calcined in the air at a temperature of 500° C. for 3 hours to obtain ceria/zirconia/lanthanum oxide composite oxide powder (having an oxide weight ratio of 22/73/5 and a specific surface area of 80 $m^2/g$).

A honeycomb catalyst structure having a catalyst layer with a thickness of 20 μm comprising the above-mentioned catalyst was obtained in the same manner as Example 1 by using 30 g of the β-zeolite powdery catalyst supporting 0.75% of rhodium metal, 15 g of the ceria/zirconia/lanthanum oxide composite oxide powder and 15 g of the catalyst powder supporting 2% of platinum on the alumina prepared in Example 1.

Example 3

β-zeolite powdery catalyst supporting 1% (on the basis of β-zeolite powdery catalyst) of rhodium metal in terms of rhodium was obtained in the same manner as Example 1 except for using 66.67 g of aqueous solution of rhodium nitrate.

77.83 g of cerium nitrate ($Ce(NO_3)_3.6H_2O$), 36.03 g of zirconium oxynitrate ($ZrO(NO_3)_2$) and 35.26 g of praseodymium nitrate ($Pr(NO_3)_3.6H_2O$) were dissolved in 1700 ml of ion-exchanged water to prepare an aqueous solution. 0.1-N ammonia water was added to the aqueous solution to neutralize and hydrolyze the cerium salt, oxyzirconium salt and praseodymium salt, and the resulting mixture was aged at a temperature of 80° C. for one hour. The product was separated from the obtained slurry by filtering, dried at a temperature of 120° C. for 24 hours, and then calcined in the air at a temperature of 500° C. for 3 hours to obtain ceria/zirconia/praseodymium oxide composite oxide powder (having an oxide weight ratio of 47/33/22 and a specific surface area of 205 $m^2/g$).

A honeycomb catalyst structure having a catalyst layer with a thickness of 20 μm comprising the above-mentioned catalysts was obtained in the same manner as Example 1 by using 30 g of the β-zeolite powdery catalyst supporting 1% of rhodium metal, 15 g of the ceria/zirconia/praseodymium oxide composite oxide powder and 15 g of the catalyst powder supporting 2% of platinum on the alumina prepared in Example 1.

Example 4

ZSM-5-zeolite powdery catalyst supporting 0.75% of rhodium metal in terms of rhodium was obtained in the same manner as Example 1 except for using hydrogen type ZSM-5-zeolite (such that CVB3024 manufactured by Zeolyst International was calcined in the air at a temperature of 500° C., $SiO_2/Al_2O_3$ molar ratio=30) as zeolite and using 56.40 g of aqueous solution of rhodium nitrate.

109.43 g of cerium nitrate ($Ce(NO_3)_3.6H_2O$), 31.27 g of zirconium oxynitrate ($ZrO(NO_3)_2$) and 15.63 g of neodymium nitrate ($Nd(NO_3)_3.6H_2O$) were dissolved in 1700 ml of ion-exchanged water to prepare an aqueous solution. 0.1-N ammonia water was added to the aqueous solution to neutralize and hydrolyze the cerium salt, oxyzirconium salt and neodymium salt, and the resulting mixture was aged at a temperature of 80° C. for one hour. The resulting product was separated from the obtained slurry by filtering, dried at a temperature of 120° C. for 24 hours, and then calcined in the air at a temperature of 500° C. for 3 hours to obtain ceria/zirconia/neodymium oxide composite oxide powder (having an oxide weight ratio of 70/20/10 and a specific surface area of 171 $m^2/g$). Then, a honeycomb catalyst structure having a catalyst layer with a thickness of 20 µm comprising the above-mentioned catalyst was obtained as a catalyst hereinafter in the same manner as Example 1.

3.40 g of aqueous solution of $Pt(NH_3)_4(NO_3)_4$ (9.0% as platinum) and 33.50 g of rhodium nitrate aqueous solution (0.9% as rhodium) was added to 1700 ml of ion-exchanged water to prepare an aqueous solution. 15 g of γ-alumina (KC-501, manufactured by Sumitomo Chemical Co., Ltd.) was added to the aqueous solution, dried at a temperature of 100° C. while stirred, and then calcined in the air at a temperature of 500° C. for 3 hours to obtain a catalyst powder supporting 2% of platinum and 0.5% of rhodium on the alumina.

A honeycomb catalyst structure having a catalyst layer with a thickness of 20 µm comprising the above-mentioned catalyst was obtained in the same manner as Example 1 by using 30 g of the ZSM-5-zeolite powdery catalyst supporting 0.75% of rhodium metal, 15 g of the ceria/zirconia/neodymium oxide composite oxide powder and 15 g of the catalyst powder supporting 2% of platinum and 0.5% of rhodium on the alumina.

Example 5

USY-zeolite powdery catalyst supporting 0.5% of rhodium metal in terms of rhodium was obtained in the same manner as Example 1 except for using hydrogen type USY-zeolite (CVB720, manufactured by Zeolyst International, $SiO_2/Al_2O_3$ molar ratio=30) as zeolite.

3.40 g of aqueous solution of $Pt(NH_3)_4(NO_3)_4$ (9.0% as platinum) and 1.70 g of aqueous solution of palladium nitrate (0.9% as palladium) were added to 1700 ml of ion-exchanged water to prepare an aqueous solution. 15 g of γ-alumina (KC-501, manufactured by Sumitomo Chemical Co., Ltd.) was added to the aqueous solution, dried at a temperature of 100° C. while stirred, and then calcined in ter air at a temperature of 500° C. for 3 hours to obtain a catalyst powder supporting 2% of platinum and 1% of palladium on the alumina.

A honeycomb catalyst structure having a catalyst layer with a thickness of 20 µm comprising the above-mentioned catalyst was obtained in the same manner as Example 1 by using 15 g of the USY-zeolite powdery catalyst supporting 0.5% of rhodium metal, 15 g of the ceria powder prepared in Example 1 and 15 g of the catalyst powder supporting 2% of platinum and 1% of palladium on the alumina.

Example 6

Ferrierite-zeolite powdery catalyst supporting 0.5% of rhodium metal in terms of rhodium was obtained in the same manner as Example 1 except for using hydrogen type ferrierite-zeolite (such that CP914 ($SiO_2/Al_2O_3$ molar ratio=55) manufactured by Zeolyst International was calcined in the air at a temperature of 500° C.) as zeolite and using 33.50 g of rhodium nitrate aqueous solution.

A honeycomb catalyst structure having a catalyst layer with a thickness of 20 µm was obtained in the same manner as Example 1 by using 30 g of the ferrierite-zeolite powdery catalyst supporting 0.5% of rhodium metal, 15 g of the ceria powder prepared in Example 1 and 15 g of the catalyst powder supporting 2% of platinum on the alumina prepared in Example 1.

Example 7

7.60 g of aqueous solution of palladium nitrate (8.01% as palladium) was added to 1700 ml of ion-exchanged water. 60 g of ammonia type β-zeolite (BEA-25, manufactured by Zoude Chemical Inc., $SiO_2/Al_2O_3$ molar ratio=25) was dried at a temperature of 120° C. for 24 hours and then added to the above palladium nitrate aqueous solution to obtain slurry.

The slurry was dried at a temperature of 80° C. by using a rotary evaporator (RE111, manufactured by Buch Inc.). β-zeolite supporting palladium was thus obtained and then calcined in the air at a temperature of 500° C. for one hour to obtain β-zeolite powdery catalyst supporting 1% (on the basis of β-zeolite powdery catalyst) of palladium metal in terms of palladium.

A honeycomb catalyst structure having a catalyst layer with a thickness of 20 µm was obtained in the same manner as Example 1 by using 30 g of the β-zeolite powdery catalyst supporting 1% of palladium metal, 15 g of the ceria powder prepared in Example 1 and 15 g of the catalyst powder supporting 2% of platinum on the alumina prepared in Example 1.

Example 8

β-zeolite powdery catalyst supporting 0.2% of rhodium metal in terms of rhodium and 1% of palladium metal in terms of palladium was obtained in the same manner as Example 1 except for using 13.44 g of aqueous solution of rhodium nitrate and 6.75 g of aqueous solution of palladium nitrate (9.0% as palladium).

A honeycomb catalyst structure having a catalyst layer with a thickness of 20 µm was obtained in the same manner as Example 1 by using 30 g of the β-zeolite powdery catalyst supporting 0.2% of rhodium metal and 1% of palladium metal, 15 g of the ceria powder prepared in Example 1 and 15 g of the catalyst powder supporting 2% of platinum on the alumina prepared in Example 1.

Example 9

A honeycomb catalyst structure having a catalyst layer with a thickness of 20 µm was obtained in the same manner as Example 1 by using 45 g of the β-zeolite powdery catalyst supporting 0.5% of rhodium metal, 7.5 g of the ceria powder and 7.5 g of the catalyst powder supporting 2% of platinum on the alumina, each prepared in Example 1.

Example 10

A honeycomb catalyst structure having a catalyst layer with a thickness of 20 μm was obtained in the same manner as Example 1 by using 30 g of the β-zeolite powdery catalyst supporting 0.5% of rhodium metal, 7.5 g of the ceria powder and 22.5 g of the catalyst powder supporting 2% of platinum on the alumina, each prepared in Example 1.

Example 11

A honeycomb catalyst structure having a catalyst layer with a thickness of 20 μm was obtained in the same manner as Example 1 by using 30 g of the β-zeolite powdery catalyst supporting 0.5% of rhodium metal, 22.5 g of the ceria powder and 7.5 g of the catalyst powder supporting 2% of platinum on the alumina, each prepared in Example 1.

Example 12

A honeycomb catalyst structure having a catalyst layer with a thickness of 20 μm was obtained in the same manner as Example 1 by using 15 g of the β-zeolite powdery catalyst supporting 0.5% of rhodium metal, 22.5 g of the ceria powder and 22.5 g of the catalyst powder supporting 2% of platinum on the alumina, each prepared in Example 1.

Comparative Example 1

β-zeolite powdery catalyst supporting 0.25% (on the basis of β-zeolite powdery catalyst) of rhodium metal was prepared in the same manner as Example 1 except for using 16.80 g of aqueous solution of rhodium nitrate (0.90% as rhodium). 60 g of the β-zeolite powdery catalyst was mixed with 12 g of silica sol (SNOWTEX N, manufactured by Nissan Chemical Industries, Ltd. (20% by weight as silica)) and an appropriate amount of water. The resulting mixture was ground with a planetary mill for 5 minutes by using 50 g of zirconia balls as grinding media to obtain a coating slurry. A honeycomb substrate made of cordierite having a cell number of 400 per square inch was coated with the coating slurry to obtain as a catalyst a honeycomb catalyst structure having a catalyst layer with a thickness of 20 μm comprising the above-mentioned catalyst.

(1) Performance Test

A nitrogen oxide-containing gas was treated under the conditions below by using each of the catalysts prepared in the Examples 1 to 12 and Comparative Example 1. The NOx conversion was measured by a chemical luminescence method. The results are shown in Table 1.

The composition of the gas mixture used in the decomposition experiment of NOx under the rich conditions was as follows:
NO: 500 ppm
$SO_2$: 40 ppm
$O_2$: 0.4 ppm
CO: 2% by volume
$C_3H_6$ (propylene): 2000 ppm
$H_2O$: 9.0% by volume
$H_2$: 2% by volume The gas under the lean conditions was prepared by injecting oxygen into the gas mixture used under the rich conditions, and the composition thereof was as follows:
NO: 456 ppm
$SO_2$: 37 ppm
CO: 1.8% by volume
$C_3H_6$ (propylene): 1822 ppm
$H_2O$: 8.2% by volume
$H_2$: 1.8% by volume The gas atmosphere was periodically oscillated between the rich/lean conditions at intervals of 10 to 120 seconds, and the rich time was adjusted to be one tenth of the lean time. Space velocity was 70000 $h^{-1}$ under the lean conditions and 69312 $h^{-1}$ under the rich conditions. The reaction temperature was 150, 200, 250, 300 or 400° C. The results are shown in Table 1.

TABLE 1

| | Nox CONVERSION (%) Temperature (C. °) | | | | | |
|---|---|---|---|---|---|---|
| | 150 | 200 | 250 | 300 | 350 | 400 |
| Example 1 | 70.8 | 83.2 | 82.7 | 79.2 | 74.4 | 65.1 |
| Example 2 | 72.6 | 87.6 | 85.2 | 82.3 | 77.9 | 68.4 |
| Example 3 | 74.7 | 89.9 | 87.7 | 84.5 | 78.5 | 70.9 |
| Example 4 | 69.1 | 81.2 | 89.5 | 76.9 | 70.5 | 61.3 |
| Example 5 | 58.6 | 70.9 | 71.6 | 71.5 | 69.4 | 59.1 |
| Example 6 | 53.8 | 68.5 | 69.4 | 68.1 | 66.4 | 58.2 |
| Example 7 | 81.4 | 82.5 | 79.1 | 76.4 | 69.8 | 62.1 |
| Example 8 | 87.2 | 91.5 | 86.3 | 82.1 | 76.1 | 65.3 |
| Example 9 | 72.3 | 85.8 | 82.1 | 76.9 | 72.7 | 60.0 |
| Example 10 | 71.7 | 83.9 | 81.6 | 75.0 | 71.9 | 62.5 |
| Example 11 | 68.5 | 82.5 | 82.0 | 80.2 | 78.5 | 71.6 |
| Example 12 | 62.3 | 74.1 | 78.5 | 75.9 | 74.6 | 70.4 |
| Comparative 1 | 62.7 | 69.1 | 59.3 | 57.1 | 52.4 | 48.2 |

(2) Test for Confirming the Generation of Nitrogen

The catalysts in the form of particulate sieved so as to have a particle diameter of 0.25 to 0.5 mm were prepared in Examples 1, 10, 11 and Comparative Example 1. The catalysts were used for performing a test for confirming the generation of nitrogen under the conditions described below.

The gas composition under the lean conditions was NO of 1000 ppm, oxygen of 9% by volume and the balance of helium, and 15% by volume of hydrogen was jetted into the rich gas for forming the rich conditions. The gas after the reaction on the side of an outlet was subject to continuous observation with regard to nitrogen, NOx, oxygen and hydrogen by using a quadrupole mass spectrometer (OMNISTAR, manufactured by Balzer Inc.). The reaction was performed on the conditions of a temperature of 200° C. and a catalyst weight/gas flow ratio (W/F) of 0.06 g·second/cc.

Figure 2:
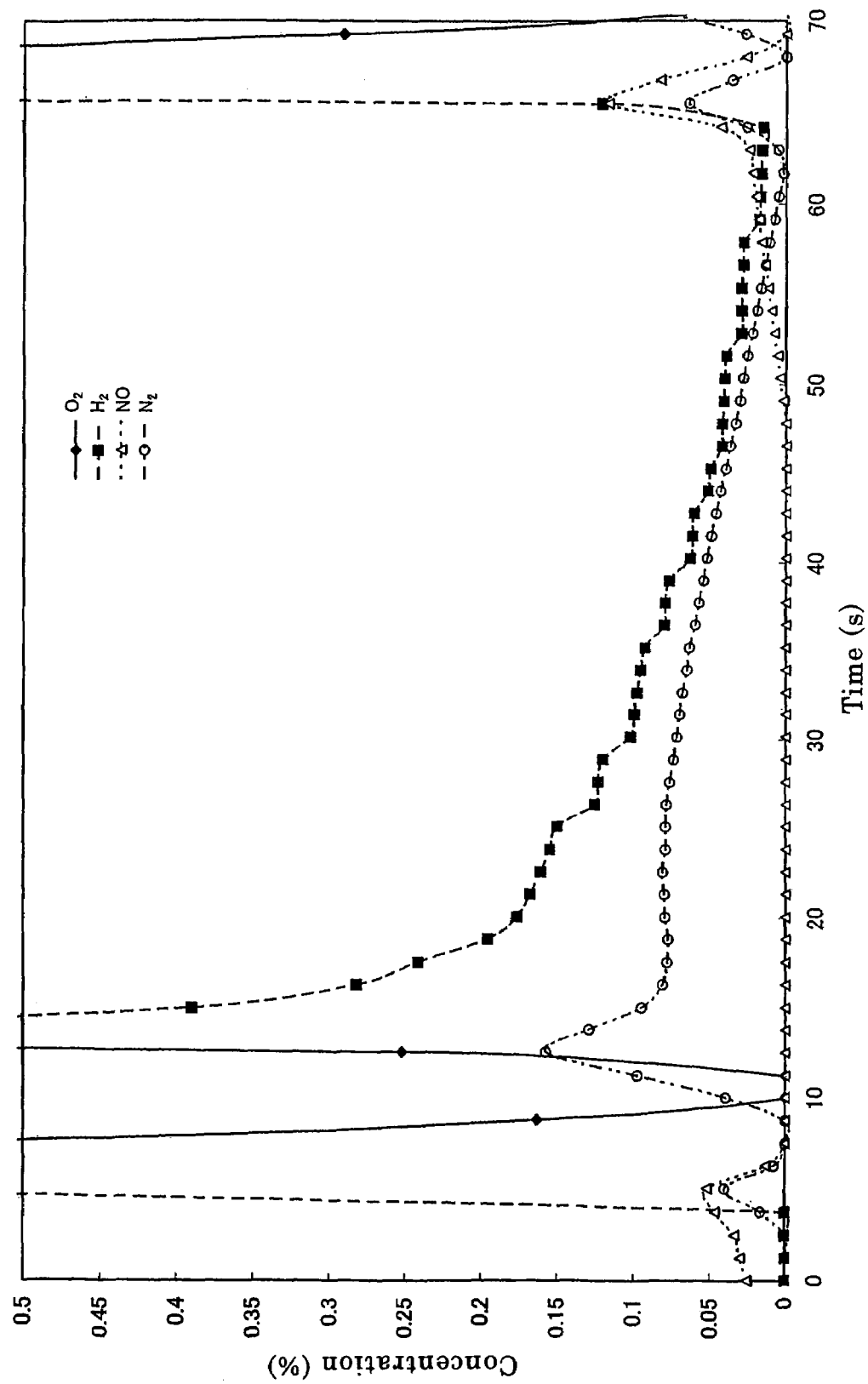
FIG. 2 is a graph showing changes of the concentration of main components generated in the resulting gases with time when nitrogen oxides contained in exhaust gases are subjected to catalytic reaction in the presence of an example of the catalysts according to the invention.

FIG. 2 shows a profile of the direct decomposition reaction of nitrogen oxides contained in exhaust gases using the catalyst prepared in Example 1; when a point of time at which hydrogen was jetted into the rich gas was regarded as time 0 (second), the hydrogen concentration exceeded the scale in a few seconds and the oxygen concentration decreased abruptly therewith to provide the rich gas conditions. Then, the concentration of nitrogen as a decomposition product of NOx increased as the concentration of NOx decreased. Thereafter, the generation of nitrogen continued further even though the concentration of hydrogen in the gas decreased to bring the lean conditions containing almost no reducing agent.

Thus, according to the method using the catalyst of the invention, nitrogen was generated under the gas conditions containing no reducing agents (hydrogen), so that it was found that NOx was directly decomposed on the catalyst, unlike selective reduction reaction of NO by reducing agents.

Figure 3:
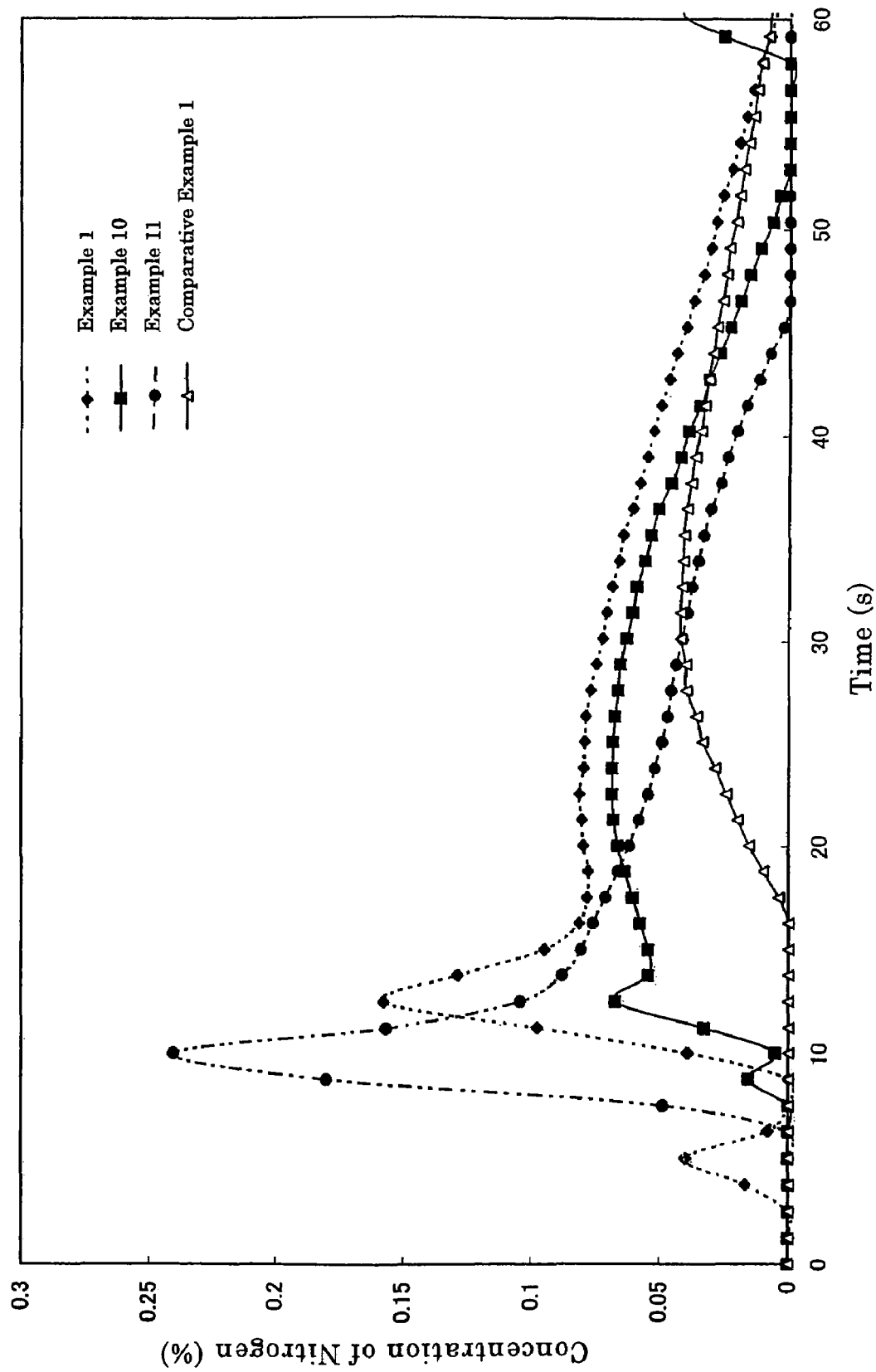
FIG. 3 is a graph showing changes of the amount of nitrogen generated in the resulting gases with time when nitrogen oxides contained in exhaust gases are subjected to catalytic reaction in the presence of each of the catalysts prepared in Examples 1, 10, 11 and Comparative Example 1.

FIG. 3 shows changes of the concentration of nitrogen generated in the catalytic reaction of exhaust gases with time in the presence of each of the catalysts prepared in Examples 1, 10, 11 and Comparative Example 1. The amount of nitrogen generated in the lean periods is largest when the catalyst prepared in Example 1 was used among the three catalysts examined. That is, among the three catalysts examined, the catalyst of Example 1 is most excellent in the direct decomposition activity of nitrogen oxides.

The invention claimed is:

1. A catalyst for catalytic direct decomposition of nitrogen oxides contained in exhaust gases wherein fuel is supplied and subjected to combustion under periodic rich/lean conditions and the resulting exhaust gases are brought into contact therewith, which catalyst comprises:
  (A) a first catalyst component comprising at least one metal selected from the group consisting of rhodium and palladium supported on zeolite;
  (B) a second catalyst component comprising at least one selected from the group consisting of
  (a) ceria,
  (b) praseodymium oxide, and
  (c) a mixture and/or a composite oxide of oxides of at least two elements selected from the group consisting of cerium, zirconium, praseodymium, neodymium, terbium, samarium, gadolinium and lanthanum; and
  (C) a third catalyst component comprising
  (a) at least one selected from the group consisting of platinum, rhodium, palladium and oxides thereof, and
  (b) a carrier.

2. A method for catalytic direct decomposition of nitrogen oxides contained in exhaust gases wherein fuel is supplied and subjected to combustion under periodic rich/lean conditions and the resulting exhaust gases are brought into contact with a catalyst, which catalyst comprises:
  (A) a first catalyst component comprising at least one metal selected from the group consisting of rhodium and palladium supported on zeolite;
  (B) a second catalyst component comprising at least one selected from the group consisting of
  (a) ceria,
  (b) praseodymium oxide, and
  (c) a mixture and/or a composite oxide of oxides of at least two elements selected from the group consisting of cerium, zirconium, praseodymium, neodymium, terbium, samarium, gadolinium and lanthanum; and
  (C) a third catalyst component comprising
  (a) at least one selected from the group consisting of platinum, rhodium, palladium and oxides thereof, and
  (b) a carrier.

* * * * *